United States Patent
Montoya

(10) Patent No.: US 11,060,806 B2
(45) Date of Patent: Jul. 13, 2021

(54) ARMOR SLEEVE SNOUT FOR FLEXIBLE TUBE CLEANING LANCE POSITIONER APPARATUS

(71) Applicant: STONEAGE, INC., Durango, CO (US)

(72) Inventor: Cody R. Montoya, Durango, CO (US)

(73) Assignee: STONEAGE, INC., Durango, CO (US)

(*) Notice: Subject to any disclaimer, the term of this patent is extended or adjusted under 35 U.S.C. 154(b) by 344 days.

(21) Appl. No.: 16/108,572

(22) Filed: Aug. 22, 2018

(65) Prior Publication Data
US 2019/0063856 A1 Feb. 28, 2019

Related U.S. Application Data

(60) Provisional application No. 62/549,796, filed on Aug. 24, 2017.

(51) Int. Cl.
*F16L 21/08* (2006.01)
*F28G 15/02* (2006.01)
(Continued)

(52) U.S. Cl.
CPC .............. *F28G 15/02* (2013.01); *F16L 11/18* (2013.01); *F16L 21/08* (2013.01); *F16L 25/08* (2013.01); *F16L 37/18* (2013.01); *F28G 1/163* (2013.01)

(58) Field of Classification Search
CPC . F16L 25/10; F16L 21/00; F16L 21/08; F16L 37/18
(Continued)

(56) References Cited

U.S. PATENT DOCUMENTS 445,250 A * 1/1891 Lawless ................. F16L 11/18
285/113
2,650,112 A * 8/1953 Kinkead .............. F16L 39/005
285/404
(Continued)

FOREIGN PATENT DOCUMENTS

CA 2674159 A1 * 1/2011 ............. B65D 90/22
JP H03-332600 A 2/1991
(Continued)

OTHER PUBLICATIONS

International Search Report and Written Opinion, dated Nov. 27, 2018, from corresponding International Patent App. No. PCT/US2018/047452.

*Primary Examiner* — David Bochna
(74) *Attorney, Agent, or Firm* — Greenberg Traurig, LLP

(57) ABSTRACT

A snout apparatus for guiding high pressure flexible lances between a lance drive apparatus and a flexible lance positioner apparatus includes one of a male tubular connector and a female tubular connector fitting adapted to fasten to a flexible lance drive apparatus, another one of a male and a female tubular connector fitting adapted to fasten to a flexible lance positioner, and a plurality of segments connected together in series so as to connect in series between the one and another connector fittings. Each segment may include a cylindrical tube portion sized to receive and pass therethrough flexible lances and a tubular collar portion connected to the tube portion. The collar portion has peripheral arcuate closed slots adjacent to and spaced around a distal end of the collar portion. Shoulder bolt fasteners are each fastened to a next segment tube portion and extend through one of the closed slots.

20 Claims, 3 Drawing Sheets

(51) Int. Cl.
*F16L 37/18* (2006.01)
*F16L 11/18* (2006.01)
*F16L 25/08* (2006.01)
*F28G 1/16* (2006.01)

(58) Field of Classification Search
USPC ........ 285/148.8, 128.23, 148.28, 148.1, 404, 285/115, 116, 148.3, 282
See application file for complete search history.

(56) References Cited

U.S. PATENT DOCUMENTS

| | | | | |
|---|---|---|---|---|
| 2,894,537 | A * | 7/1959 | Carr | F16L 9/18 285/404 |
| 3,189,372 | A * | 6/1965 | Johnson | F16L 11/18 285/91 |
| 3,272,537 | A * | 9/1966 | Bellatorre | F16L 39/005 285/187 |
| 3,633,948 | A * | 1/1972 | Dickey | F16L 37/18 285/312 |
| 4,643,457 | A | 2/1987 | Press | |
| 5,368,343 | A * | 11/1994 | Allen | F16L 37/18 285/311 |
| 5,944,364 | A * | 8/1999 | Harle | F16L 37/18 285/145.2 |
| 8,562,255 | B2 * | 10/2013 | Persson | F16L 1/20 405/168.1 |
| 9,822,918 | B2 * | 11/2017 | Persson | F16L 3/1226 |
| 10,473,249 | B1 * | 11/2019 | Hartman | F16L 37/18 |
| 2005/0189768 | A1 | 9/2005 | Avram et al. | |
| 2010/0329792 | A1 * | 12/2010 | Persson | F16L 57/02 405/168.1 |
| 2013/0233435 | A1 | 9/2013 | Henthorn et al. | |
| 2013/0285374 | A1 | 10/2013 | Kobayashi et al. | |
| 2017/0107076 | A1 | 4/2017 | Barnes | |
| 2019/0128455 | A1 * | 5/2019 | Parlow | F16L 25/08 |

FOREIGN PATENT DOCUMENTS

| | | | | |
|---|---|---|---|---|
| JP | H06-51674 U | | 7/1994 | |
| JP | 07253183 A | * | 10/1995 | ............ F16L 21/00 |
| JP | 08011997 A | * | 1/1996 | ............ F16L 37/18 |

\* cited by examiner

ARMOR SLEEVE SNOUT FOR FLEXIBLE TUBE CLEANING LANCE POSITIONER APPARATUS

CROSS-REFERENCE TO RELATED APPLICATION

This application claims the benefit of priority to U.S. Patent Application No. 62/549,796, filed Aug. 24, 2017, entitled "ARMOR SLEEVE SNOUT FOR FLEXIBLE TUBE CLEANING LANCE POSITIONER APPARATUS", which is incorporated herein by reference in its entirety.

BACKGROUND OF THE DISCLOSURE

The present disclosure is directed to high pressure fluid rotary nozzle systems. In particular, embodiments of the present disclosure are directed to a guide snout for passing flexible tube cleaning lances from a lance drive apparatus from outside a confined space to an apparatus for positioning one or more flexible tube cleaning lances in registry with a heat exchanger tube sheet within a dome or other confined space.

In order to run one or more flexible lances from a drive apparatus located outside a heat exchanger tube sheet dome to an apparatus for precisely positioning cleaning lances in registry with heat exchanger tubes in a tube sheet without removing the domed cover over the heat exchanger tube sheet and minimizing the number and frequency of required vessel entries an apparatus for guiding and restraining movement of the flexible lances is needed.

SUMMARY OF THE DISCLOSURE

The present disclosure directly addresses such needs. One exemplary embodiment in accordance with the present disclosure of a snout includes a male and/or female lever clamp fitting connected together via a plurality of linkage segments. A snout apparatus for guiding high pressure flexible lances between a lance drive apparatus and a flexible lance positioner apparatus may be viewed as including one of a male tubular connector and a female tubular connector fitting adapted to fasten to a flexible lance drive apparatus, another one of a male and a female tubular connector fitting adapted to fasten to a flexible lance positioner apparatus, and a plurality of snout segments connected together in series so as to connect in series between the one and another connector fittings. Each snout segment may include a cylindrical tube portion sized to receive and pass therethrough a plurality of flexible lances and a tubular collar portion connected to the tube portion. The collar portion is preferably larger in diameter than the tube portion and has a plurality of peripheral arcuate closed slots adjacent to and spaced around a distal end of the collar portion. A plurality of shoulder bolt fasteners are each fastened to a next segment tube portion and extend through one of the closed slots. The proximal end of the next snout segment tube portion fits within the distal end of the tubular collar portion. Each tube portion preferably has a tubular plastic liner sleeve fastened to an inner surface of the tube portion. The tube portion and collar portions may be integrally connected or may be separate tube and collar elements fastened together.

In the latter case, the collar element has a proximal end fastened to the tube element by at least one shoulder bolt extending through at least one peripheral closed slot adjacent the proximal end of the collar element and the collar element has a distal end and at least one peripheral closed slot adjacent the distal end for receiving therethrough another shoulder bolt fastenable to one of a next tube element of a next segment and one of the connector fittings. Preferably the proximal and distal ends of the collar element are chamfered at an angle of between 5 and 15 degrees and preferably at about 10 degrees. Each slot is sized to slidably retain a shoulder of the shoulder bolt installed therein. Preferably each tube portion has four threaded bores equally spaced around a proximal end of the tube portion for receiving a threaded end of one of the shoulder bolts.

An embodiment in accordance with the present disclosure may alternatively be viewed as a snout apparatus that includes one of a male and female cam-lock connector fitting adapted to fasten to a flexible lance drive apparatus, another one of a male and female cam-lock connector fitting adapted to fasten to a flexible lance positioner apparatus, and a plurality of snout segments connected together in series so as to connect the cam-lock connector fittings together. Each snout segment may have a single cylindrical tubular tube element sized to receive and pass therethrough a plurality of flexible lances, and a tubular collar element sized to receive one end of the tube element. Each collar element has a first end and a second end, each end having at least two closed peripheral slots adjacent the end. A plurality of fasteners are each fastened to the tube element and have a shoulder portion extending through the collar through one of the closed slots. At least one end of the collar has two diametrically opposed closed slots for receiving a shoulder bolt therethrough. A proximal end of a next snout segment tube element fits within the distal end of the tubular collar element. Preferably each tube element has a tubular plastic liner sleeve fastened to an inner surface of the tube element. Preferably the tube element and collar portions are separate tube and collar elements fastened together by diametrically oppositely positioned shoulder bolts.

The collar element preferably has a proximal end fastened to the tube element by at least one shoulder bolt extending through at least one peripheral closed slot adjacent the proximal end of the collar element and the collar element has a distal end and at least one peripheral closed slot adjacent the distal end for receiving therethrough another shoulder bolt fastenable to one of a next tube element of a next segment and one of the connector fittings. The proximal and distal ends of the collar element are chamfered at an angle of between 5 and 15 degrees and preferably at about 10 degrees. Each slot is preferably sized to slidably retain a shoulder of the shoulder bolt installed therein and each collar element has four equally spaced apart closed slots adjacent each of the proximal and distal ends of the collar element.

Further features, advantages and characteristics of the embodiments of this disclosure will be apparent from reading the following detailed description when taken in conjunction with the drawing figures.

DETAILED DESCRIPTION

Figure 1:
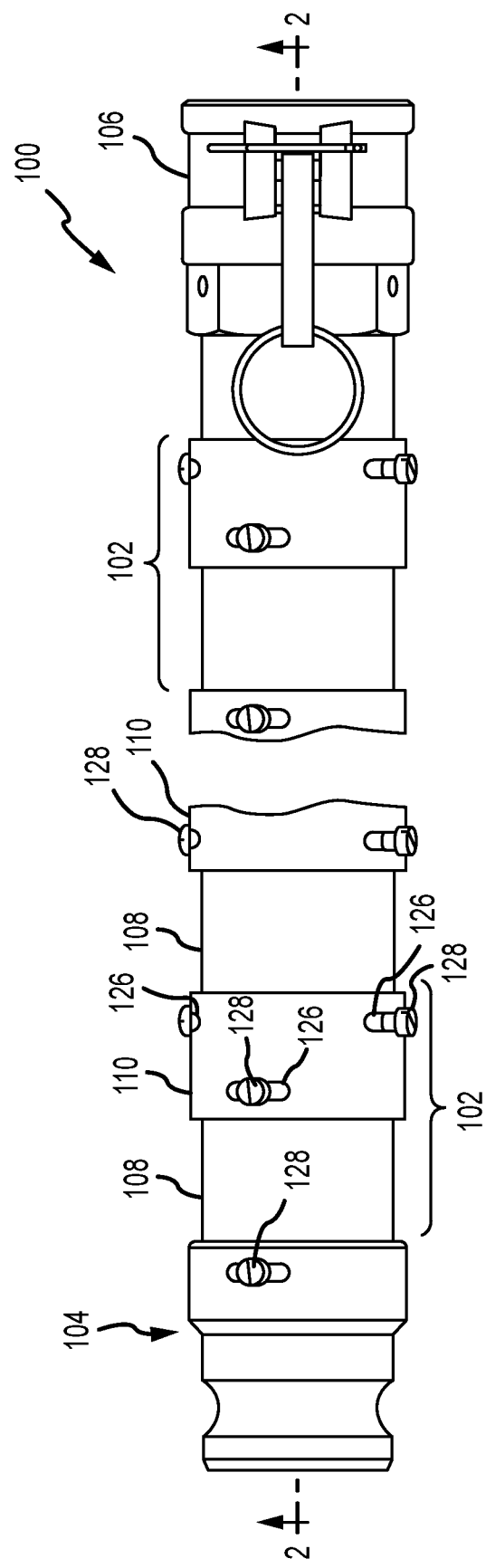
FIG. 1 is an assembled side view of a first embodiment of an apparatus in accordance with the present disclosure for installation between a lance drive apparatus located outside of a heat exchanger and a lance positioner apparatus installed adjacent a heat exchanger tube sheet within a domed cover enclosure of the heat exchanger.

FIG. 1 shows an assembled side view of a first exemplary snout apparatus 100 in accordance with the present disclosure. The snout apparatus 100 may be inserted through a heat exchanger man-way (not shown) and extend from a lance drive mechanism (not shown), positioned outside the heat exchanger, for example, with an opposite end fastened to a flexible lance positioner apparatus in turn fastened to a heat exchanger tube sheet (also not shown). In this embodiment of the apparatus 100, the snout 100 carries and guides one, two or three flexible lances to the lance positioner apparatus (not shown).

In this embodiment, the snout apparatus 100 includes multiple snout segments 102 connected together in series. In this exemplary embodiment 100 the end segment 102 is fastened to a male tubular connector fitting 104. The other end of the series of connected snout segments 102 is fastened to a female tubular connector fitting 106 which is, in turn, configured to be connected to an appropriate connection on either the lance positioner apparatus (not shown) or the lance drive apparatus (likewise not shown). The use of a female connector fitting 106 or male fitting 104 purely depends on the corresponding fitting on the end apparatus. Hence the snout apparatus may optionally utilize two male fittings 104 or two female fittings 106 instead of one of each type. Preferably these fittings are cam-lock type quick disconnect fittings 104 and 106 that can be quickly engaged or disengaged as may be needed in the particular installation application.

One exemplary lance drive apparatus is shown in U.S. Pat. No. 9,630,901 B1. A suitable exemplary lance positioner apparatus is shown in U.S. Provisional Patent Application No. 62/473,601 filed Mar. 20, 2017, the content of both of which are incorporated herein by reference herein in their entirety.

Figure 2:
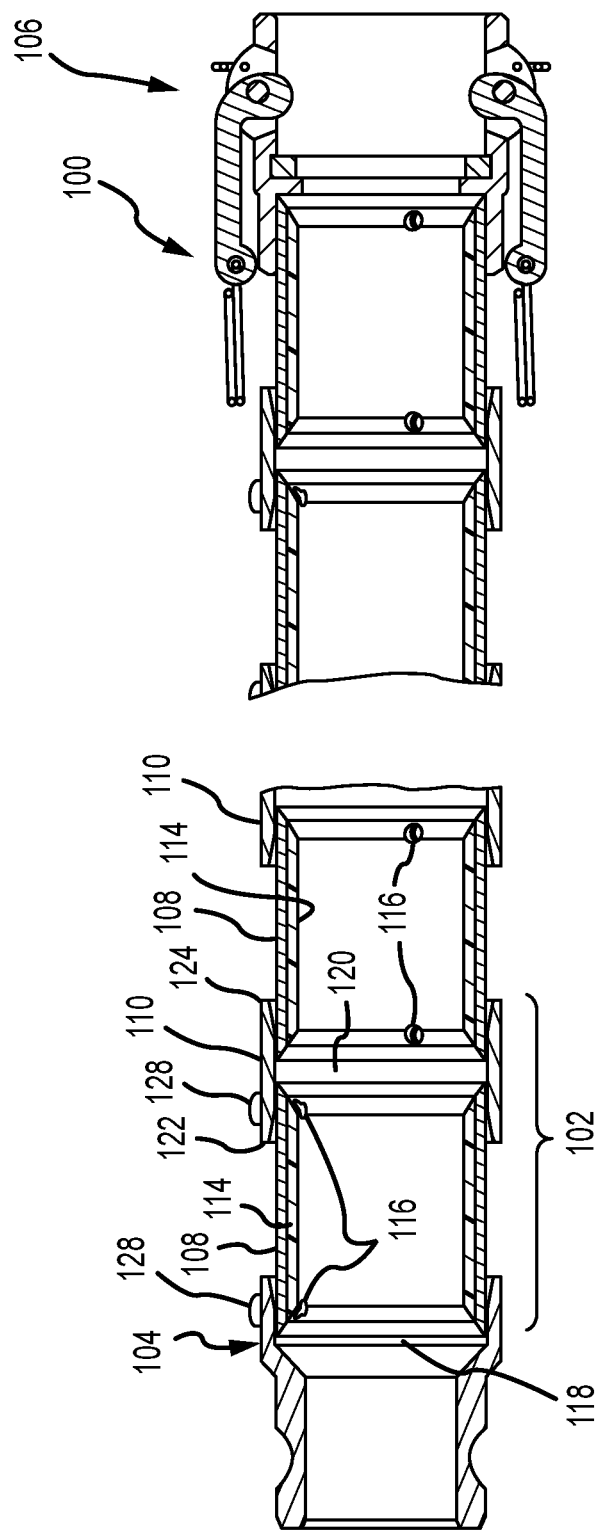
FIG. 2 is a separate exploded side view of the components of the apparatus shown in FIG. 1.

In the exemplary embodiment 100 shown in FIGS. 1 and 2, each segment 102 comprises a tubular element 108, a collar element 110, and a plurality of shoulder bolts 112. In addition, each tubular element 108 is preferably lined with a high molecular weight plastic tube lining 114 to provide a smooth contact/guide surface for the two or three lances being carried through the snout 100. Lining 114 may be a rigid sleeve received within tubular element 108 or may be a coating applied to the inside surface of the element 108.

Each tube element 108 is about 3 inches long and has at least two and preferably four threaded bores 116 spaced equally apart around and adjacent its proximal end 118. Similarly, the distal end 120 of each tubular element 108 has at least two and preferably four threaded bores 116 spaced apart around and adjacent the distal end 120.

The collar element 110 of each segment 102 has a proximal end 122 and a distal end 124. Each end has a plurality of peripheral closed slots 126 therearound and preferably two or four equally spaced apart adjacent the end 122 or 124. These slots 126 may be arcuately offset from the slots 126 at the other end of the collar element 110. For example, if there are two slots 126 adjacent each end 122 and 124 they would preferably be diametrically opposed and arcuately offset 90 degrees as shown in FIGS. 1 and 2.

In the illustrated embodiment shown in FIGS. 1 and 2, each of the slots 126 is preferably at least about 0.50 inch long and slightly more than about 0.250 inch wide. For a 2.25 inch inside diameter tube element 108, the outer diameter would be about 2.50 inches. Each collar element 110 is preferably less than 2 inches long, about 1.7 inches, and has an ID of about 2.55 inch. In addition, the inner walls adjacent the ends 122 and 124 are outwardly tapered at an angle up to about 45 degrees, and preferably between about 5 to 15 degrees, and more preferably about 10 degrees to limit the amount of deflection of each segment to about 10 degrees. This is done to limit the bend radius for the flexible lances being carried through the snout 100 such that they are easily moved forward and backward through the snout as may be required in the particular service application.

Each segment 102 further has at least four and preferably six shoulder bolts 128 with two fastening the segment 102 to one adjacent segment 102, two fastening the segment 102 to a next adjacent segment 102 or connector fitting 104 or 106, and two fastening the collar 110 to the tubular element 108. As is shown in FIGS. 1 and 2, each longitudinal set of shoulder bolts 128 are positioned in slots 126 that are arcuately displaced 90 degrees. In addition, the chamfering or angling of the collar 110 ends to about 10 degrees permits a maximum bend of the each segment 102 to about 20 degrees or less. This limitation of bend is necessary to ensure smooth transition of the flexible lance hoses carried within the snout 100. The diameter the shoulder bolt shoulders is preferably slightly less than 0.25 inch thus ensuring close but loose fit of each tube element 108 within a collar element 110 while also permitting rotation of the snout 100 adjacent segments 102 up to about 25 degrees in this exemplary embodiment. In other embodiments, each of the slots 126 may have a different length, depending on the amount of maximum bend that is desired for a particular combination of lance hoses to be carried by the snout apparatus.

Figure 3:
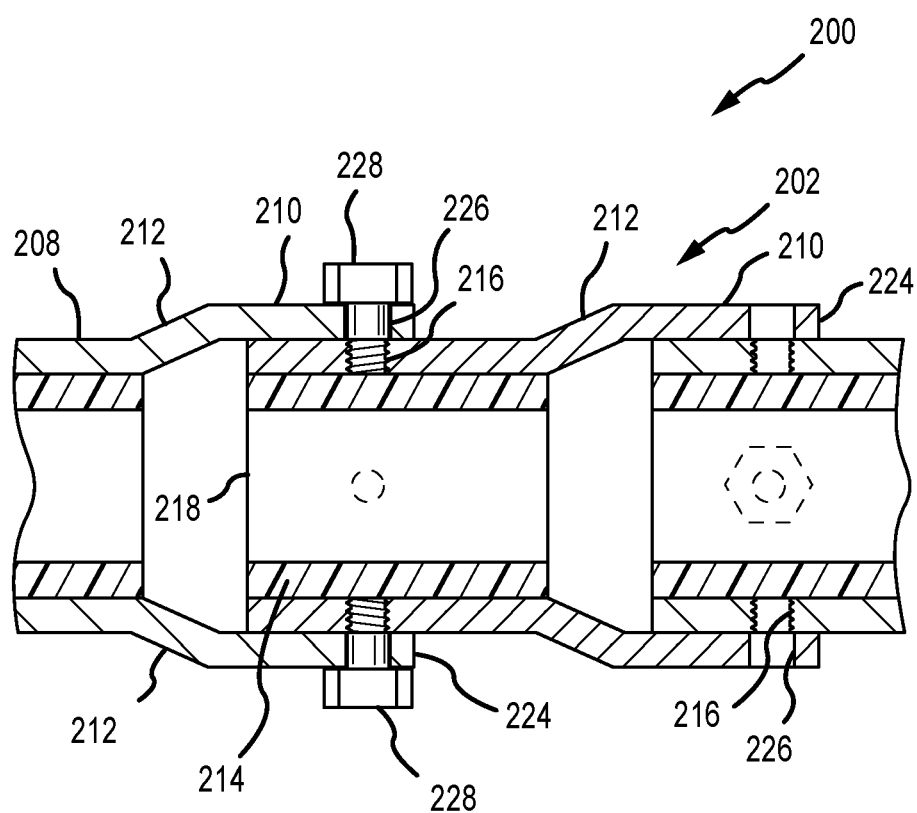
FIG. 3 is a side view of a second exemplary embodiment of a snout apparatus in accordance with the present disclosure.

Another embodiment of a snout 200 in accordance with the present disclosure is shown in FIG. 3. Here again, the snout 200 comprises a series of segments 202 connected together in series, with one end segment 202 connected to one of a male and female connector fitting 204, 206 and the other end segment 202 connected to another of one of a male and female connector fitting 204, 206 as may be needed to connect the snout 200 between a lance drive apparatus and a lance positioner apparatus.

Each of the snout segments 202 has a tube portion 208 and a collar portion 210. Connecting these portions 208 and 210 together is an integral truncated conical tubular transition portion 212 therebetween. The collar portion 210 has a plurality of peripheral slots 226 adjacent a distal end 224 of the collar portion 210. In this embodiment 200, each segment 202 is a single piece structure. However, as in the first embodiment described above, the tube portion 208 is preferably lined or fitted with an internal sleeve layer 214 of plastic such as high molecular weight polyethylene to facilitate smooth passage of flexible lances therethrough.

The outer diameter of the collar portion 210 is similar to that of the first exemplary snout 100. The peripheral slots 226 adjacent the distal end of the collar portion again are sized to receive and pass the shoulders of shoulder bolts 228 threaded into appropriate threaded bores 216 adjacent the proximal end 218 of a tube portion 208 of the next segment 202. The inner surface adjacent a distal end 224 of the collar portion 210 is chamfered again at an angle up to about 45 degrees, and preferably between 5 and 15 degrees and more preferably about 10 degrees to limit the bend of each adjacent segment 202. However, in this second embodiment, the range of bend is more limited than in the first embodiment described above. Also, the amount of rotation of each segment 202 is more limited than that of adjacent segments in the snout 100 described above. Each snout segment 202 is joined to an adjacent snout segment 202 via two shoulder bolts 228 passing through the slots 226 adjacent the distal end of the segment 202 and threaded into the tube portion of the next segment 202, and by two shoulder bolts 228 passing through the slots 226 adjacent the distal end of a prior segment 202 or to a connector fitting such as one of cam-lock fittings 204 or 206. Again, each successive set of shoulder bolts 228 are preferably arcuately displaced from each other by 90 degrees.

Many changes may be made to the snout apparatus 100, which will become apparent to a reader of this disclosure. For example, more than two threaded bores 216 and shoulder bolts 228 may be utilized. The transition portion 212 in the second exemplary embodiment 200 may be smoothly curved rather than conical as shown. Other fasteners than shoulder bolts may be utilized. For example, a standard machine screw with a bushing may be substituted for each shoulder bolt 228. In other embodiments, a standard straight bolt may be utilized instead of a shoulder bolt 228. The slots 226 may be circular apertures rather than elongated oval in shape in other applications.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A snout apparatus for guiding high pressure flexible lances between a lance drive apparatus and a flexible lance positioner apparatus, the snout apparatus comprising:
   one of a male tubular connector and a female tubular connector fitting adapted to fasten to a flexible lance drive apparatus;
   another one of a male and a female tubular connector fitting adapted to fasten to a flexible lance positioner apparatus; and
   a plurality of snout segments connected together in series so as to connect in series between the one and another connector fittings, wherein each snout segment comprises a cylindrical tube portion sized to receive and pass therethrough a plurality of flexible lances, and a tubular collar portion connected to the tube portion, wherein the collar portion is larger in diameter than the tube portion and has a plurality of peripheral circumferentially elongated closed slots adjacent to and spaced around a distal end of the collar portion, and a plurality of shoulder bolts each fastened to a next segment tube portion and extending through one of the closed slots.

2. The apparatus according to claim 1 wherein a proximal end of the next snout segment tube portion fits within the distal end of the tubular collar portion.

3. The apparatus according to claim 1 wherein each tube portion has a tubular plastic liner sleeve fastened to an inner surface of the tube portion.

4. The apparatus according to claim 1 wherein the tube portion and collar portions are separate tube and collar elements fastened together.

5. The apparatus according to claim 4 wherein the collar element has a proximal end fastened to the tube element by at least one shoulder bolt extending through at least one peripheral closed slot adjacent the proximal end of the collar element and the collar element has a distal end and at least one peripheral closed slot adjacent the distal end for receiving therethrough another shoulder bolt fastenable to one of a next tube element of a next segment and one of the connector fittings.

6. The apparatus according to claim 5 wherein each slot is sized to slidably retain a shoulder of the shoulder bolt installed therein.

7. The apparatus according to claim 4 wherein the proximal and distal ends of the collar element are chamfered at an angle of between 5 and 15 degrees.

8. The apparatus according to claim 7 wherein the inside surface of the proximal and distal ends of the collar are chamfered at an angle of 10 degrees.

9. The apparatus according to claim 1 wherein each tube portion has four threaded bores equally spaced around a proximal end of the tube portion for receiving a threaded end of one of the shoulder bolts.

10. The apparatus according to claim 1 wherein each segment is a single unitary body wherein the tube portion and collar portion are joined together by a conical tubular transition portion.

11. A snout apparatus comprising:
    one of a male and female cam-lock connector fitting adapted to fasten to a flexible lance drive apparatus;
    another one of a male and female cam-lock connector fitting adapted to fasten to a flexible lance positioner apparatus; and
    a plurality of snout segments connected together in series so as to connect the cam-lock connector fittings together, each snout segment having a single cylindrical tubular tube element sized to receive and pass therethrough a plurality of flexible lances, and a tubular collar element sized to receive one end of the tube element, each collar element having a first end and a second end, each end having at least two closed peripheral slots adjacent the end, and a plurality of fasteners each fastened to the tube element and having a shoulder portion extending through the collar through one of the closed slots, wherein at least one end of the collar has two diametrically opposed closed slots.

12. The apparatus according to claim 11 wherein a proximal end of a next snout segment tube element fits within the distal end of the tubular collar element.

13. The apparatus according to claim 11 wherein each tube element has a tubular plastic liner sleeve fastened to an inner surface of the tube element.

14. The apparatus according to claim 11 wherein the tube element and collar portions are separate tube and collar elements fastened together by diametrically oppositely positioned shoulder bolts.

15. The apparatus according to claim 14 wherein the proximal and distal ends of the collar element are chamfered at an angle of between 5 and 15 degrees.

16. The apparatus according to claim 15 wherein the inside surface of the proximal and distal ends of the collar are chamfered at an angle of 10 degrees.

17. The apparatus according to claim 11 wherein the collar element has a proximal end fastened to the tube element by at least one shoulder bolt extending through at least one peripheral closed slot adjacent the proximal end of the collar element and the collar element has a distal end and at least one peripheral closed slot adjacent the distal end for receiving therethrough another shoulder bolt fastenable to one of a next tube element of a next segment and one of the connector fittings.

18. The apparatus according to claim 11 wherein each slot is sized to slidably retain a shoulder of the shoulder bolt installed therein.

19. The apparatus according to claim 11 wherein each tube element has four threaded bores equally spaced around a proximal end of the tube portion for receiving a threaded end of one of the shoulder bolts.

20. The apparatus according to claim 19 wherein each collar element has four equally spaced apart closed slots adjacent each of the proximal and distal ends of the collar element.

\* \* \* \* \*